Nov. 27, 1923.
C. A. WALES
VEHICLE BODY
Filed Nov. 9, 1920
1,475,329
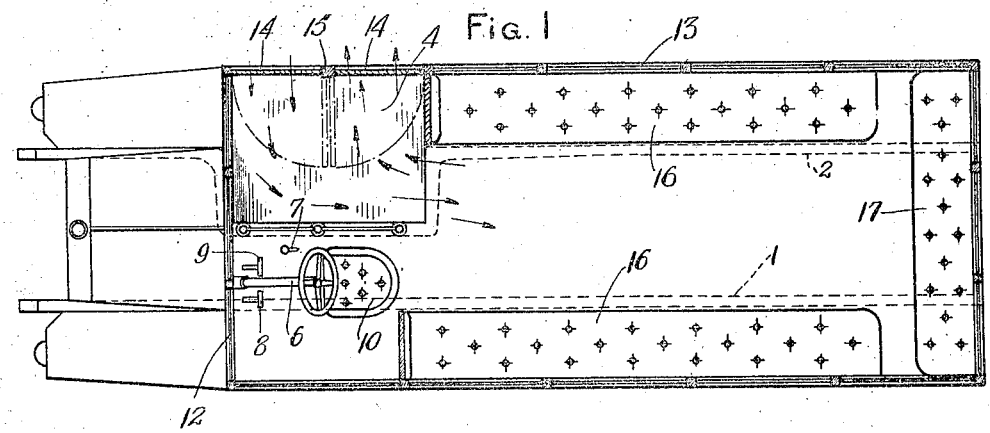
INVENTOR
Claude A. Wales
BY
A. M. Wooster
ATTORNEY Patented Nov. 27, 1923.

1,475,329

UNITED STATES PATENT OFFICE.

CLAUDE A. WALES, OF BROOKLYN, NEW YORK, ASSIGNOR TO THE PASSENGER LORRY COMPANY, A CORPORATION OF DELAWARE.

VEHICLE BODY.

Application filed November 9, 1920. Serial No. 422,779.

*To all whom it may concern:*

Be it known that I, CLAUDE A. WALES, a citizen of the United States, and resident of Brooklyn, in the county of Kings and State of New York, have invented certain new and useful Improvements in Vehicle Bodies, of which the following is a specification.

This invention relates to motor vehicles, and has particular reference to a combination frame and vehicle body particularly intended for the transportation of passengers and freight wherein a special construction is desirable in order to enable the passengers to enter and leave without an objectionable number of steps up and down, and also enabling the entrance and exit of the passengers to be under the direct observation and control of the driver. For freight, similar conditions apply in order to save time at stops.

In dealing with the problems of safely, quickly and economically handling passengers with buses operated by one man who may have to collect fares, make change, operate doors, and answer questions, besides taking on and letting off passengers, watching other traffic, and controlling his motor, speed, and brakes, it is found that unnecessary and expensive delays occur where there are several steps to be negotiated between the ground and the car floor. It is further found that a momentary crowding of passengers within the car on an intermediate loading or entrance platform is unobjectionable, provided that they do not interfere with the controls and doors, where the latter are used. It is further found that even with the lowest practicable forms of motor vehicle spring suspensions intended to lower the frame and body, several steps are necessary between the floor and the ground, as motor vehicle side frames have to be of considerable depth to obtain light weight, and cannot be dropped sufficiently to eliminate a step and still retain the necessary road clearances unless made shallow and excessively heavy. I have therefore devised a light motor vehicle frame more fully described in an application filed November 9, 1920, Serial No. 422,778, together with a cooperating body especially intended for passenger vehicles, which can be hung as low as the necessary clearance permits on any desired form of spring suspension and providing a vehicle of large capacity which can be much more cheaply operated than present standard device of passenger buses, mail and like package trucks, etc.

In order to carry out the objects of the invention one of the usual longitudinal side frames of a motor vehicle is deflected or recessed at an intermediate portion and provided with a platform carried at the bottom or below this recessed member, which platform will extend longitudinally for a substantial distance and outwardly from about the center of the frame to the outer body line, and be at or about opposite the driver's seat on the left hand side of the vehicle just behind the motor, this frame carrying a body provided with the usual front windshield, the driver's seat, and a floor elevated above the platform and extending back to the rear of the vehicle. This back portion will be provided with seats in a passenger bus or be simply a floor space for freight, or partly both, as may be desired. The entrance doors will preferably be flush with the outside line of the body at the edge of the platform, and ordinarily just in back of the wind shield.

There thus results a vehicle body having an interior loading or entrance platform depressed about a step below the main floor of the body, and also below the floor carrying the driver's seat, and capable of holding several standing passengers, packages of freight, mail sacks, etc., ready for quick trans-shipment at the stopping points. Also, the operations of discharging and taking on passengers and freight are under the observation of the driver, who furthermore cannot be interfered with by passengers, in watching other traffic, street intersections, and prospective passengers. Owing to the special frame construction employed, such a vehicle will be light and have a low center of gravity without sacrifice of strength and the platform can be built as low as permissible road clearances allow, so that a passenger can step directly between the platform and the curb, or only one step between the roadway and the platform, whereupon the doors can be closed and the vehicle can start while the passengers are paying fares and stepping up and backward to the seating space. In the case of a freight vehicle packages for discharge can be stored on the platform and can be put off with very little or no lowering, and incoming freight can be temporarily stored on the platform and distributed, as by a helper, after the vehicle stops.

The invention is shown in the accompanying drawings in several forms, wherein—

Figure 1 is a plan view of one form of body of vehicle including my invention;

Figure 2 is a plan view of a modification; and

Figure 3 is a further modification for both passengers and freight.

1 represents a longitudinal frame member of usual form composed of a deep but narrow vertically disposed channel, preferably dropped at the middle according to standard automobile practice, and 2 represents a cooperating frame member which is deflected or recessed at an intermediate portion, as at 3, to accommodate a lowered entrance space or pit, the body of which is formed by a platform 4 extending outwardly past the axis of member 2, to the side line of the body and carried at the bottom or below the side member 2 so as to be about an easy step above the ground, or at about the height of an ordinary curb. According to the specific embodiment illustrated, the longitudinal member 2 is laterally inwardly recessed at 3 toward the other longitudinal member 1. The members 1 and 2 are suitably connected by cross-members of approved form shown in detail in said application, and also by special transverse cross-members 5—5, which act to both stiffen the frame at the recessed portion and to resist torque and warping strains of the body frame. The body is supported on any approved form of front and rear springs and carries the usual wheels with motor at the front, steering-wheel 6, gear shift 7 and clutch and brake pedals 8, 9 in front of the driver's seat 10 on the left of the body opposite the platform 4. 12 is the windshield 13 the body and 14 are doors pivoted on the stanchion 15, or the doors may be of the collapsible type, or even gates, commonly used on street cars. The floor of the body is carried on transverse stringers mounted on top of the side frames 1, 2, in the usual manner, the floor being of course cut out to extend around the edge of the pit formed by the platform 4 and the recessed portion 3 of frame 2. The upper part of the body may be roofed and provided with windows, and front and rear portions, or a canopy top may be provided, or a station wagon type, etc., as desired.

In Figure 1 longitudinal seats 16 are shown and a rear cross-seat 17, while in Figure 2 individual seats 18 are shown with back to back seats 19 and the cross-seat 17. 20 is a small seat facing backward adjacent the driver's seat 10.

In Figure 3 the rear part 20 of the body is left clear for freight, in connection with the longitudinal seats 21. The passenger and freight compartments may be separated by a partition 22 with center door, if desired.

This invention provides a light and yet commodious vehicle by which the traffic can be much more expeditiously handled than with vehicles in common use at the present time, because one man can operate this vehicle as a passenger vehicle and at the same time supervise the control of the vehicle and the entrance and exit of passengers without being interfered with by them, as the driver is above and out of the way of the flow of passengers between the platform and the seating space. A vehicle having a driver and a helper of this type will be very economical to operate because of the saving in time at stopping points permitted by loading or unloading the goods to platform 4. Thus the helper can pick out the goods to be discharged at the next stop and can put them on the platform ready to discharge, while goods to be taken on can be put on the platform and the vehicle started and then distributed at leisure. At the present time there is much loss of time at stops because the packages practically have to be moved more or less the length of the vehicle at the stop.

Various modifications and changes can be made in the specific details herein described, and in the arrangement, without departing from the scope of the appended claims.

I claim—

1. A motor vehicle comprising a body structure having a floor, roof, sides and front and rear portions, a cross braced frame below said body structure, having longitudinal members extending the greater part of the length of said frame, one of said members being deflected to provide a pit space below the main floor level, a depressed entrance platform carried by said member to constitute a floor for said pit and located within an easy step of the ground, below the top of said longitudinal member, said platform extending substantially inwardly past the axis of the longitudinal member from adjacent the side of the vehicle, and a driver's seat located adjacent said entrance platform.

2. A one man operated bus comprising an engine located in the forward portion thereof, a body structure having a floor, roof, sides and front and rear portions, a cross braced frame below said body structure, having longitudinal members extending the greater part of the length of said frame, one of said members being intermediately deflected to provide a pit space below the main floor level, a depressed entrance platform carried by said member to constitute a floor for said pit and located within an easy step of the ground, below the top of said longitudinal member, said platform extending substantially inwardly past the axis of the longitudinal member from adjacent the side of the vehicle to adjacent the longitudinal center of the vehicle, and cross members bracing said longitudinal frame members.

3. A motor vehicle comprising a body structure having a floor, roof, sides and front and rear portions, a cross braced frame below said body structure, having longitudinal members extending the greater part of the length of said frame, one of said members being laterally inwardly recessed to provide a pit space below the main floor level, a depressed entrance platform carried by said member to constitute a floor for said pit and located within an easy step of the ground, below the top of said longitudinal member, said platform extending substantially inwardly past the axis of the longitudinal member from adjacent the side of the vehicle, and a driver's seat located adjacent said entrance platform.

Signed at New York in the county of New York and State of New York this 8th day of November A. D. 1920.

CLAUDE A. WALES.